(12) United States Patent
Kramer et al.

(10) Patent No.: US 9,613,624 B1
(45) Date of Patent: Apr. 4, 2017

(54) DYNAMIC PRUNING IN SPEECH RECOGNITION

(71) Applicant: Amazon Technologies, Inc., Reno, NV (US)

(72) Inventors: Jake Simon Kramer, Cambridge, MA (US); Alexander David Rosen, Somerville, MA (US); Kenneth John Basye, Sutton, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 164 days.

(21) Appl. No.: 14/314,563

(22) Filed: Jun. 25, 2014

(51) Int. Cl.
G10L 15/00 (2013.01)
G10L 15/22 (2006.01)
G10L 19/00 (2013.01)
G10L 15/04 (2013.01)

(52) U.S. Cl.
CPC .............. *G10L 15/22* (2013.01); *G10L 19/00* (2013.01)

(58) Field of Classification Search
CPC . G10L 15/22; G10L 19/00; G10L 3/16; G10L 25/78; G10L 17/02
USPC .......................... 704/231, 249, 251, 252, 254
See application file for complete search history.

(56) References Cited

U.S. PATENT DOCUMENTS

| 6,317,716 | B1 * | 11/2001 | Braida | G09B 21/009 |
| | | | | 704/270 |
| 2005/0080619 | A1 * | 4/2005 | Choi | G01S 3/8006 |
| | | | | 704/215 |
| 2014/0074482 | A1 * | 3/2014 | Ohno | G10L 13/04 |
| | | | | 704/275 |

* cited by examiner

*Primary Examiner* — Thierry L Pham
(74) *Attorney, Agent, or Firm* — Seyfarth Shaw LLP; Ilan N. Barzilay; Alvin Y. Fashu-Kanu

(57) ABSTRACT

In a dynamic automatic speech recognition (ASR) processing system, ASR processing may be configured to estimate a latency of returning speech results to a user based on work being done by an ASR processor. The ASR processing system may measure work done by an ASR processor by measuring one or more time independent metrics and comparing the metrics to threshold values. If the metrics exceed the thresholds, the ASR system may take steps to reduce latency associated with processing the utterance, including adjusting a speech recognition parameter.

14 Claims, 10 Drawing Sheets

DYNAMIC PRUNING IN SPEECH RECOGNITION

BACKGROUND

Human-computer interactions have progressed to the point where humans can control computing devices, and provide input to those devices, by speaking. Computing devices employ techniques to identify the words spoken by a human user based on the various qualities of a received audio input or signal. Such techniques are called speech recognition or automatic speech recognition (ASR). Speech recognition combined with language processing techniques may allow a user to control a computing device to perform tasks based on the user's spoken commands. Speech recognition may also convert a user's speech into text data, which may then be provided to various textual based programs and applications.

Speech recognition may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
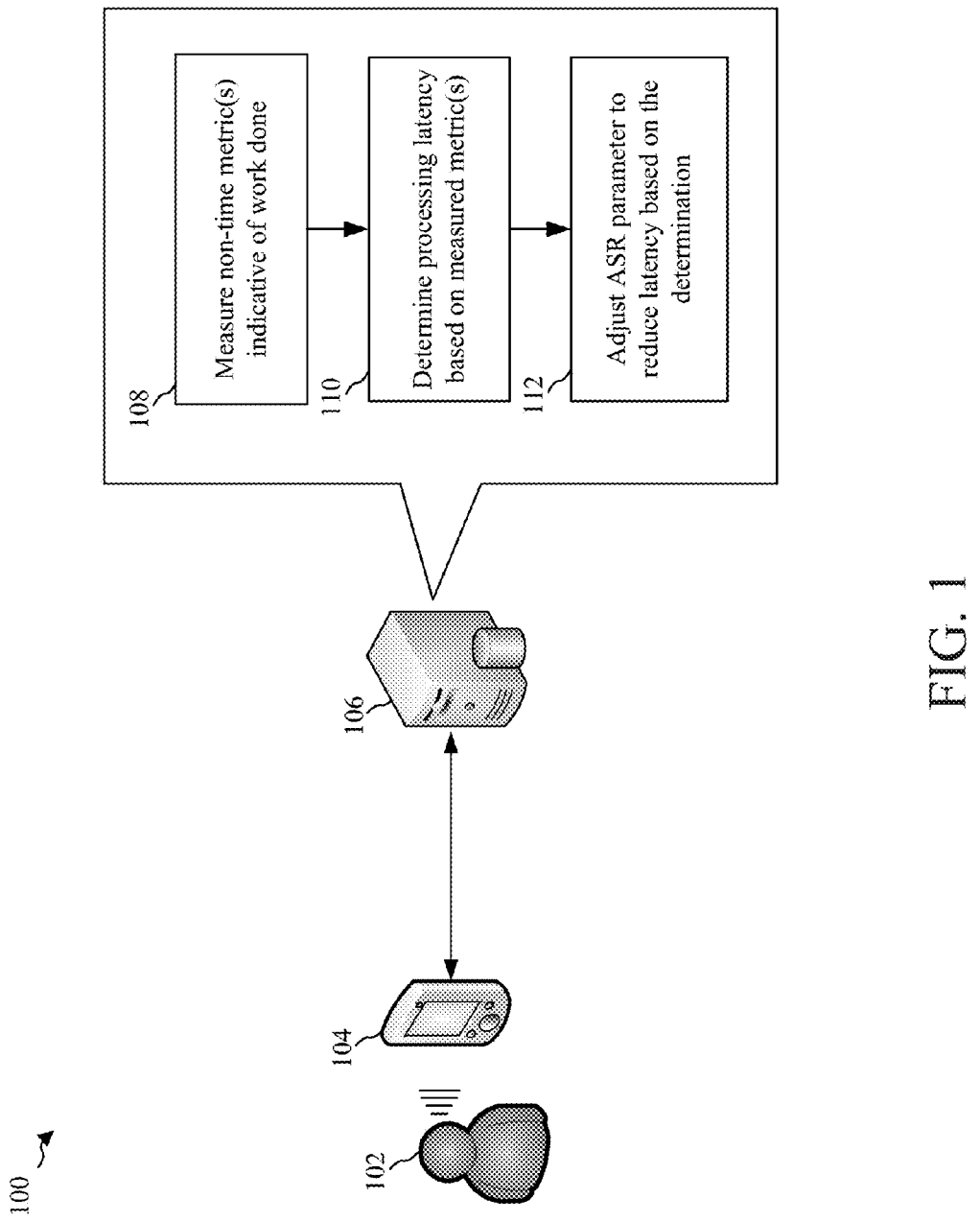
FIG. 1 illustrates a speech recognition system for dynamically reducing processing for an ongoing utterance according to aspects of the present disclosure.

Automatic speech recognition (ASR) systems may be implemented in single devices or in a distributed computing system where local, typically lower power devices, are connected to remotely distributed, typically higher power devices, to perform ASR processing. Typically, the local devices are nearest to users and take an audio input from the users. That audio input is then sent to the remote devices that process the audio into text and then send results back to the local device. The results may include text but may also include commands or other actions corresponding to the speech to perform on the local device. For example, a user may ask a local device to display the weather. The audio from the request may be processed by the remote device, which may return to the local device some combination of text, commands and/or other information to display to the user in response to the weather request.

The multiple layers involved in ASR processing, whether in a distributed system or limited to a local device, may involve significant computing resources. As a result, a user may notice a delay between the time a spoken command is given to a device and the user sees any results. This delay may be referred to as end-to-end latency. Latency may be the result of multiple factors, including the time for transporting data back and forth between a local device and a remote device, the time for pre-processing of a voice signal prior to actual speech recognition, the processing of the speech, the execution of a command based on the input speech, and other factors. To improve a user's experience it is desirable to reduce latency and to keep any user noticeable delays within an acceptable threshold or target latency. An ASR system may implement techniques to detect, during speech processing, that latency is likely to go above an acceptable threshold or target latency, and therefore implement other techniques to reduce the latency. Many latency-reducing techniques may also reduce ASR accuracy, and therefore it is beneficial to use them only when latency is expected to be above that threshold or target.

One common way to measure latency of speech recognition is through time. Time measurements (in seconds, milliseconds, etc.) give a precise measurement of how long ASR processing of frames of an audio signal (or portions thereof) takes to process. Certain systems thus may implement latency reducing techniques if ASR latency crosses a certain time threshold.

Focusing on time alone, however, can have drawbacks. Specifically, because ASR latency speed depends on the amount of dedicated computing resources, the time taken for a particular ASR process may vary depending on the load or other conditions experienced by the actual device(s) performing the ASR processing. Thus, the same ASR task may experience different latency when handled by two different machines, or even may experience different latency when handled by the same machine at two different times, such as when the machine is experiencing different loads, the network delays are different, or other different computing conditions. If implementation of latency improvement techniques (such as adjusting ASR output to reduce output quality but improve output speed) is based on time, ASR systems may become non-deterministic, resulting in the same ASR input yielding different ASR output based on computing conditions. Such non-deterministic behavior is undesirable as it may lead to other complications, for example, the difficulty of testing different latency improvement techniques as the latency improvements due to the effectiveness of the techniques are not easily separated from the latency improvements due to improved computing conditions.

Offered are a number of techniques to speed ASR processing when a speech processing system (including an ASR system and possible downstream processing) is suffering an undesirable latency. These techniques may be triggered by determining latency using non-time metric(s), that is the latency reducing techniques may be implemented based on metric(s) other than the amount of time a particular request takes to process (or other time related factors such as how long the request has been in process, etc.). The time independent metrics may indicate a level of expected latency without necessarily directly measuring latency itself. Thus, an ASR system may be configured to measure certain metrics during ongoing ASR processing and to implement latency reducing techniques based on those measurements. The techniques for speeding ASR processing discussed below may be combined with other latency reducing techniques, such as speeding networked communications between a local device and remote device, etc. In one aspect of the disclosure, a dynamic speech recognition system and method reduces latency when measurement of one or more time independent speech recognition metrics suggests that latency may be reaching undesirable levels. The speech recognition metrics are time independent to improve repeatability and/or reproducibility, thus providing some consistency for ASR processing (at least in terms of output quality) across varying computing conditions. If the metrics indicate that latency should be reduced, the system may dynamically adjust one or more speech recognition parameters during ASR processing.

FIG. 1 illustrates a speech recognition system 100 for dynamically reducing latency of an ongoing utterance according to aspects of the present disclosure. A local ASR device 104 receives a voice signal corresponding to a spoken utterance from a user 102 to facilitate speech recognition. In one aspect of the disclosure, the local ASR device 104 receives streaming audio content for ASR processing. The streaming audio content may comprise speech, music or other audio or voice signals. The local ASR device 104 sends the voice signal including the utterance or the streaming audio content to a remote ASR device 106. The remote ASR device 106 may be implemented in a remote device such as a remote server. The local ASR device 104 may be coupled to the remote ASR device 106 via a network. In some aspects of the disclosure, the ASR device 104 may stream the audio signal or voice signal to the remote ASR device 106. Thus, the ASR device processes the voice signal as the voice signal is being received.

At block 108, the remote ASR device 106 measures non-time ASR metric(s) during ASR processing of the voice signal corresponding to the spoken utterance. The non-time metric may be indicative of work done (e.g., ASR processing done up to a current time). In one aspect of the disclosure, the non-time metric(s) may be determined based on a number of processor (e.g., central processing unit (CPU)) instructions used to perform the ASR processing of the voice signal, or other factors discussed below. The remote ASR device 106, may then determine, at block 110, processing latency based on the measured metric(s). For example, based on the determination, the ASR device can determine whether processing of the voice signal is likely to be delayed and/or whether the latency is likely to be beyond an acceptable target latency. The ASR device 106 may then adjust a speech-recognition parameter based on the determination, as shown in block 112. The adjusted speech recognition parameter may adjust the speed of ASR processing going forward to reduce latency. Other latency reducing techniques may also be implemented. Various techniques for reducing latency based on the time independent metrics are discussed below. In some implementations, the speech recognition parameter adjusted may be the same as the metric measured in block 108 or may be different from the measured metric. The adjustment or the latency reducing technique may be applied at the remote ASR device 106 and/or at the local ASR device 104.

Figure 2:
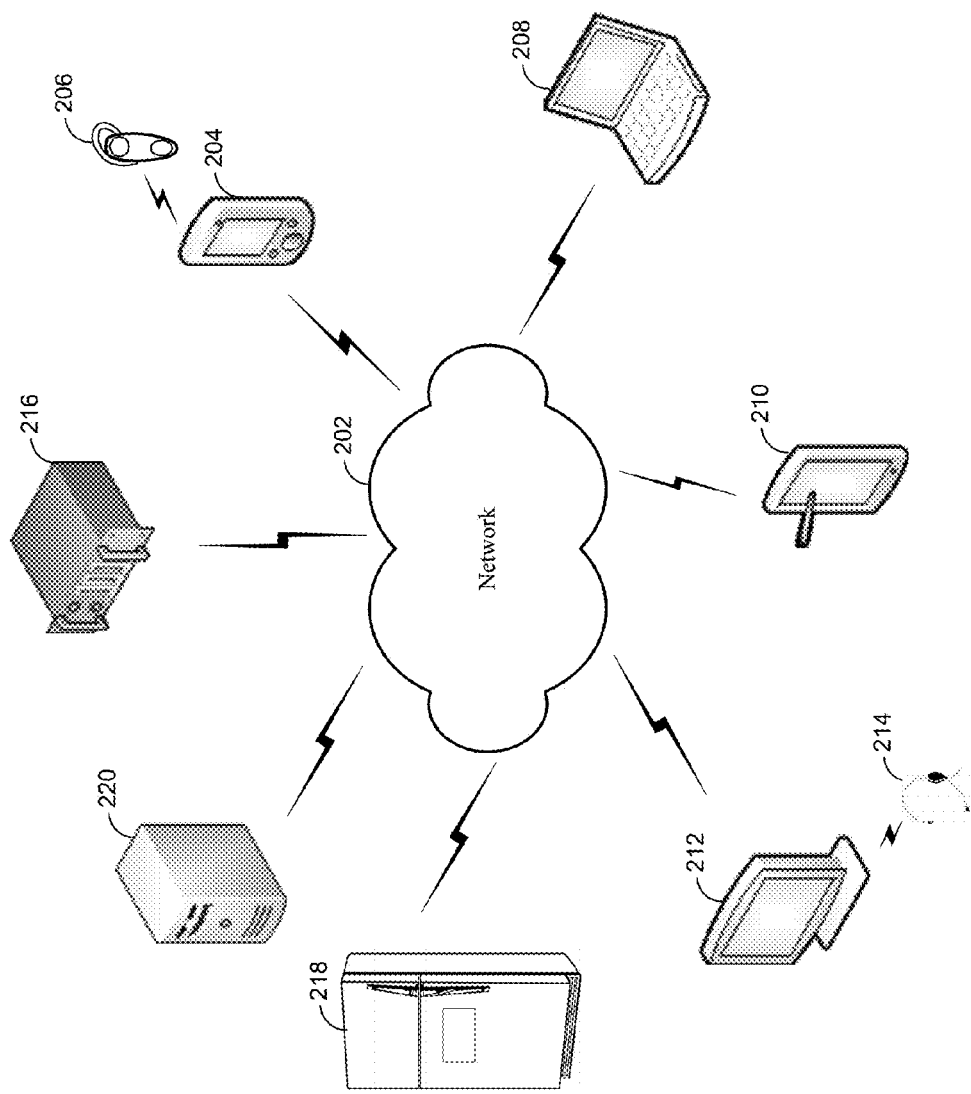
FIG. 2 illustrates a computer network for use with distributed speech recognition according to one aspect of the present disclosure.

Multiple ASR devices may be connected over a network. As shown in FIG. 2 multiple devices may be connected over network 202. Network 202 may include a local or private network or may include a wide network such as the internet. Devices may be connected to the network 202 through either wired or wireless connections. For example, a wireless device 204 may be connected to the network 202 through a wireless service provider. Other devices, such as computer 212, may connect to the network 202 through a wired connection. Other devices, such as home appliances like refrigerator 218, for example, located in a home or kiosks in a shopping establishment, etc., may connect to the network 202 through a wired or wireless connection. Other devices, such as laptop 208 or tablet computer 210 may be capable of connection to the network 202 using various connection methods including through a wireless service provider, over a WiFi connection, or the like. Networked devices may input spoken audio through a number of audio input devices including through headsets 206 or 214. Audio input devices may be connected to networked devices either through a wired or wireless connection. Networked devices may also include embedded audio input devices, such as an internal microphone (not pictured) in laptop 208, wireless device 204 or table computer 210.

In certain ASR system configurations, one device may capture an audio signal and another device may perform the ASR processing. For example, audio input to the headset 214 may be captured by computer 212 and sent over the network 202 to computer 220 or server 216 for processing. In some implementations, the computer 212 may partially process the audio signal before sending it over the network 202. Because ASR processing may involve significant computational resources, in terms of both storage and processing power, such split configurations may be employed where the device capturing the audio has lower processing capabilities than a remote device and higher quality ASR results are desired. The audio capture may occur near a user and the captured audio signal sent to another device for processing.

Figure 3:
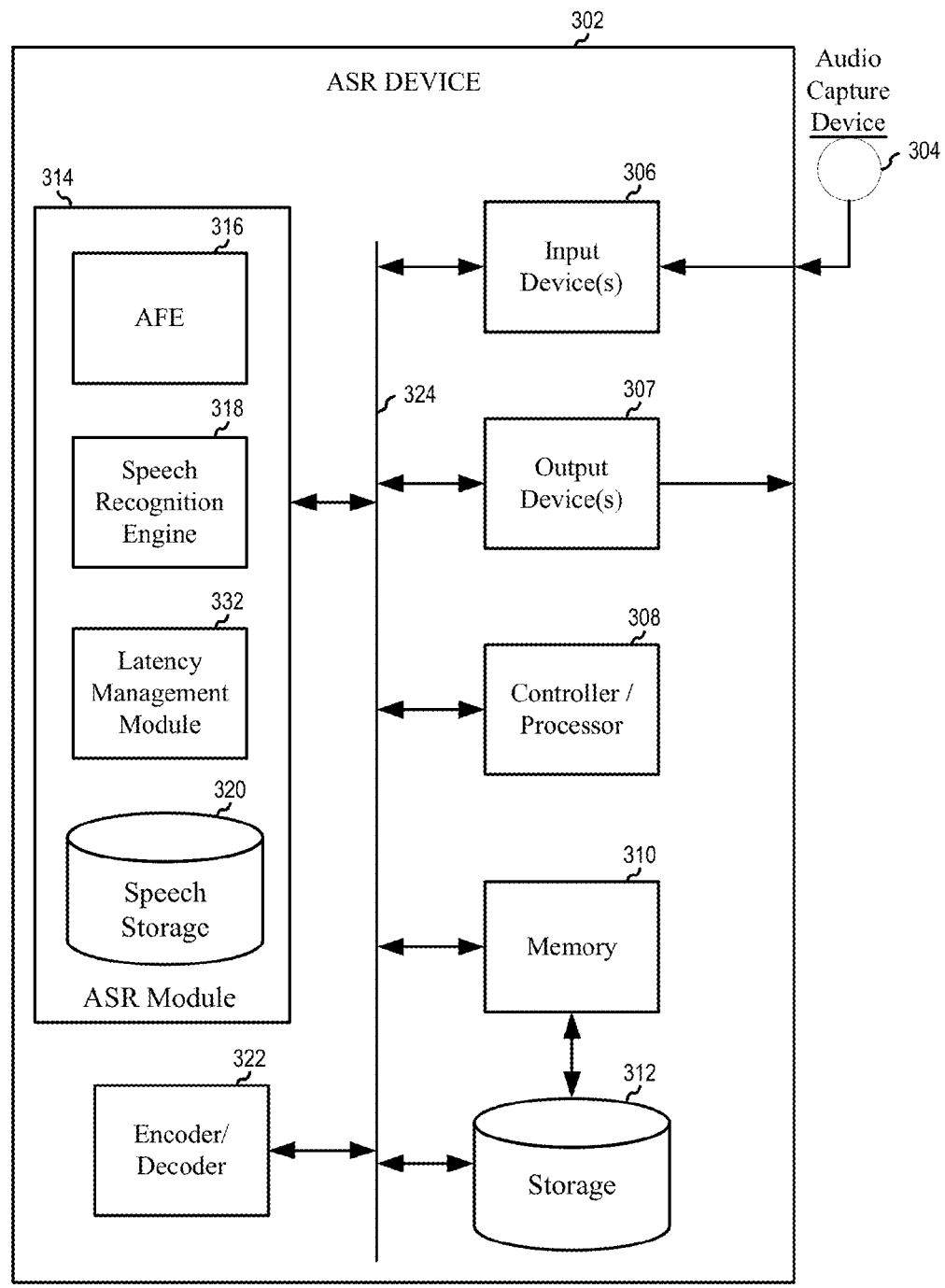
FIG. 3 is a block diagram conceptually illustrating a device for speech recognition according to one aspect of the present disclosure.

FIG. 3 shows an automatic speech recognition (ASR) device 302 for performing speech recognition. Aspects of the present disclosure include computer-readable and computer-executable instructions that may reside on the ASR device 302. FIG. 3 illustrates a number of components that may be included in the ASR device 302. However, other non-illustrated components may also be included. In addition, some of the illustrated components may not be present in every device capable of employing aspects of the present disclosure. Further, some components that are illustrated in the ASR device 302 as a single component may also appear multiple times in a single device. For example, the ASR device 302 may include multiple input devices 306, output devices 307 or multiple controllers/processors 308.

Multiple ASR devices may be employed in a single speech recognition system. In such a multi-device system, the ASR devices may include different components for performing different aspects of the speech recognition process. The multiple devices may include overlapping components. The ASR device as illustrated in FIG. 3 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The ASR device 302 may also be a component of other devices or systems that may provide speech recognition functionality such as automated teller machines (ATMs), kiosks, home appliances (such as refrigerators, ovens, etc.), vehicles (such as cars, busses, motorcycles, etc.), and/or exercise equipment, for example.

As illustrated in FIG. 3, the ASR device 302 may include an audio capture device 304 for capturing spoken utterances for processing. The audio capture device 304 may include a microphone or other suitable component for capturing sound. The audio capture device 304 may be integrated into the ASR device 302 or may be separate from the ASR device 302. The ASR device 302 may also include an address/data bus 324 for conveying data among components of the ASR device 302. Each component within the ASR device 302 may also be directly connected to other components in addition to (or instead of) being connected to other components across the bus 324.

The ASR device 302 may include a controller/processor 308 that may be a central processing unit (CPU) for processing data and computer-readable instructions and a memory 310 for storing data and instructions. The memory 310 may include volatile random access memory (RAM), non-volatile read only memory (ROM), and/or other types of memory. The ASR device 302 may also include a data storage component 312, for storing data and instructions. The data storage component 312 may include one or more storage types such as magnetic storage, optical storage, solid-state storage, etc. The ASR device 302 may also be connected to removable or external memory and/or storage (such as a removable memory card, memory key drive, networked storage, etc.) through the input device 306 or output device 307. Computer instructions for processing by the controller/processor 308 for operating the ASR device 302 and its various components may be executed by the controller/processor 308 and stored in the memory 310, storage 312, external device, or in memory/storage included in the ASR module 314 discussed below. Alternatively, some or all of the executable instructions may be embedded in hardware or firmware in addition to or instead of software. The teachings of this disclosure may be implemented in various combinations of software, firmware, and/or hardware, for example.

The ASR device 302 includes input device(s) 306 and output device(s) 307. A variety of input/output device(s) may be included in the device. Example input devices 306 include an audio capture device 304, such as a microphone (pictured as a separate component), a touch input device, keyboard, mouse, stylus or other input device. Example output devices 307 include a visual display, tactile display, audio speakers, headphones, printer or other output device. The input device 306 and/or output device 307 may also include an interface for an external peripheral device connection such as universal serial bus (USB), FireWire, Thunderbolt or other connection protocol. The input device 306 and/or output device 307 may also include a network connection such as an Ethernet port, modem, etc. The input device 306 and/or output device 307 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input device 306 and/or output device 307, the ASR device 302 may connect to a network, such as the Internet or private network, which may include a distributed computing environment.

The device may also include an ASR module 314 for processing spoken audio data into text. The ASR module 314 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 314, which then interprets the utterance based on the similarity between the utterance and models known to the ASR module 314. For example, the ASR module 314 may compare the input audio data with models for sounds (e.g., speech units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language model or grammar). Based on the considered factors and the assigned recognition score, the ASR module 314 may output the most likely words recognized in the audio data. The ASR module 314 may also output multiple alternative recognized words in the form of a lattice or an N-best list (described in more detail below).

While a recognition score may represent a probability that a portion of audio data corresponds to a particular phoneme or word, the recognition score may also incorporate other information, which indicates the ASR processing quality of the scored audio data relative to the ASR processing of other audio data. A recognition score may be represented as a number on a scale from 1 to 100, as a probability from 0 to 1, a log probability or other indicator. A recognition score may indicate a relative confidence that a section of audio data corresponds to a particular phoneme, word, etc.

The ASR module 314 may be connected to the bus 324, input device(s) 306 and/or output device(s) 307, audio capture device 304, encoder/decoder 322, controller/processor 308 and/or other component of the ASR device 302. Audio data sent to the ASR module 314 may come from the audio capture device 304 or may be received by the input device 306, such as audio data captured by a remote entity and sent to the ASR device 302 over a network. Audio data may be in the form of a digitized representation of an audio waveform of spoken utterances. The sampling rate, filtering, and other aspects of the analog-to-digital conversion process may impact the overall quality of the audio data. Various settings of the audio capture device 304 and input device 306 may be configured to adjust the audio data based on traditional tradeoffs of quality versus data size or other considerations.

The ASR module 314 includes an acoustic front end (AFE) 316, a speech recognition engine 318, and speech storage 320. The AFE 316 transforms audio data into data for processing by the speech recognition engine 318. The speech recognition engine 318 compares the speech recognition data with the acoustic, language, and other data models and information stored in the speech storage 320 for recognizing the speech contained in the original audio data. The AFE 316 and speech recognition engine 318 may include their own controller(s)/processor(s) and memory, or they may use the controller/processor 308 and memory 310 of the ASR device 302, for example. Similarly, the instructions for operating the AFE 316 and speech recognition engine 318 may be located within the ASR module 314, within the memory 310 and/or storage 312 of the ASR device 302, or within an external device.

Figure 4:
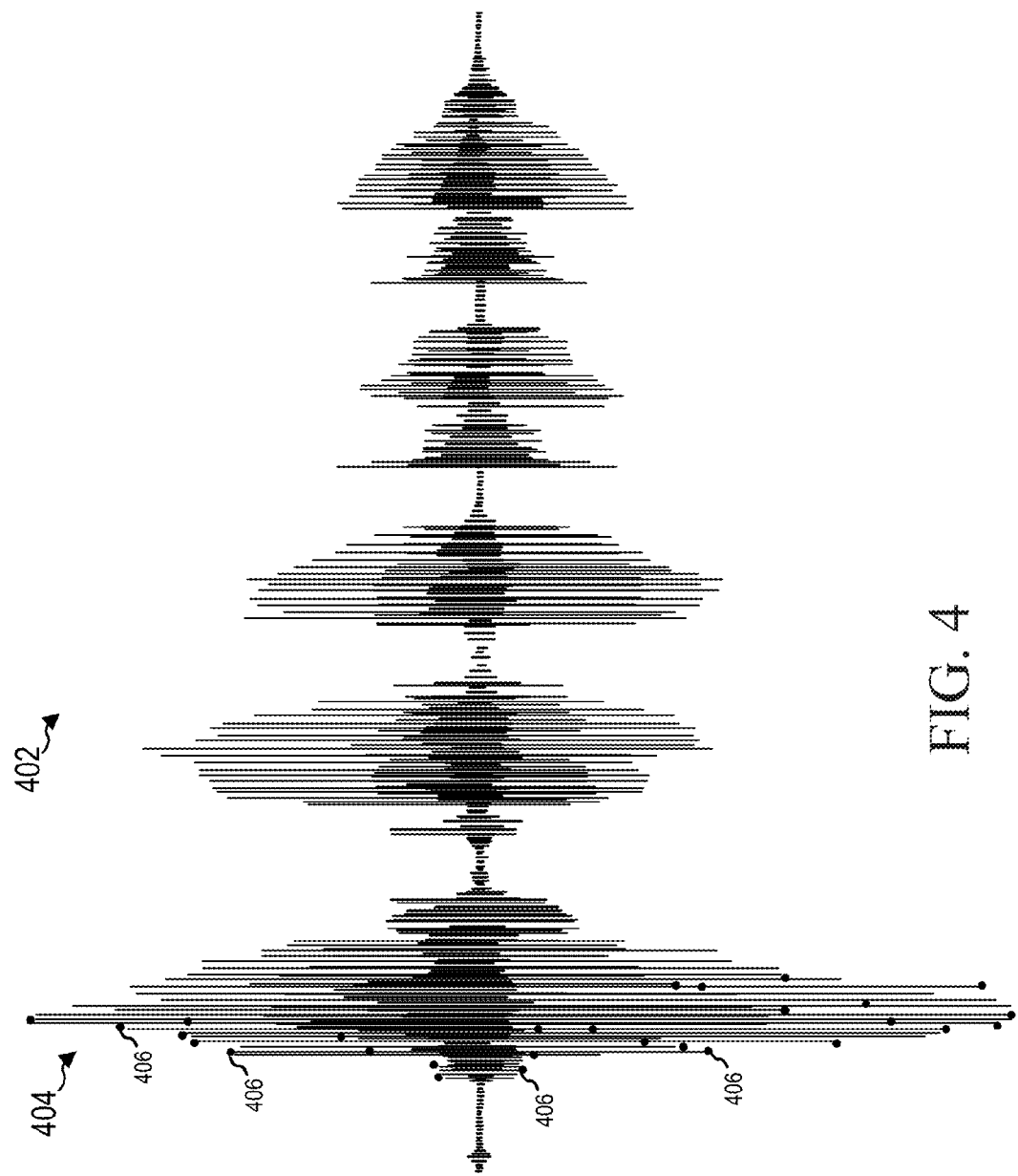
FIG. 4 illustrates an audio waveform processed according to one aspect of the present disclosure.

Received audio data may be sent to the AFE 316 for processing. The AFE 316 may reduce noise in the audio data, identify parts of the audio data containing speech for processing, and segment or portion and process the identified speech components. The AFE 316 may divide the digitized audio data into frames or audio segments, with each frame representing a time interval, for example 10 milliseconds (ms). During that frame the AFE 316 determines a set of values, called a feature vector, representing the features/qualities of the utterance portion within the frame. Feature vectors may contain a varying number of values, for example forty. The feature vector may represent different qualities of the audio data within the frame. FIG. 4 shows a digitized audio data waveform 402, with multiple points 406 of the first word 404 as the first word 404 is being processed. The audio qualities of those points may be stored into feature vectors. Feature vectors may be streamed or combined into a matrix that represents a time period of the spoken utterance. These feature vector matrices may then be passed to the speech recognition engine 318 for processing. A number of approaches may be used by the AFE 316 to process the audio data. Such approaches may include using mel-frequency cepstral coefficients (MFCCs), perceptual linear predictive (PLP) techniques, neural network feature vector techniques, linear discriminant analysis, semi-tied covariance matrices, deep belief networks or other approaches known to those of skill in the art.

Processed feature vectors may be output from the ASR module 314 and sent to the output device 307 for transmission to another device for further processing. The feature vectors may be encoded and/or compressed by the encoder/decoder 322 prior to transmission. The encoder/decoder 322 may be customized for encoding and decoding ASR data, such as digitized audio data, feature vectors, etc. The encoder/decoder 322 may also encode non-ASR data of the ASR device 302, for example using a general encoding scheme such as .zip, etc. The functionality of the encoder/decoder 322 may be located in a separate component, as illustrated in FIG. 3, or may be executed by the controller/processor 308, ASR module 314, or other component, for example.

The speech recognition engine 318 may process the output from the AFE 316 with reference to information stored in the speech storage 320. Alternatively, post front-end processed data (such as feature vectors) may be received by the ASR module 314 from another source besides the internal AFE 316. For example, another entity may process audio data into feature vectors and transmit that information to the ASR device 302 through the input device(s) 306. Feature vectors may arrive at the ASR device 302 encoded, in which case they may be decoded (for example by the encoder/decoder 322) prior to processing by the speech recognition engine 318.

The speech storage 320 includes a variety of information for speech recognition such as data matching pronunciations of phonemes to particular words. This data may be referred to as an acoustic model. The speech storage may also include a dictionary of words or a lexicon. The speech storage may also include data describing words that are likely to be used together in particular contexts. This data may be referred to as a language or grammar model. The speech storage 320 may also include a training corpus that may include recorded speech and/or corresponding transcription, that may be used to train and improve the models used by the ASR module 314 in speech recognition. The training corpus may be used to train the speech recognition models, including the acoustic models and language models, in advance. The models may then be used during ASR processing.

The training corpus may include a number of sample utterances with associated feature vectors and associated correct text that may be used to create, for example, acoustic models and language models. The sample utterances may be used to create mathematical models corresponding to expected audio for particular speech units. Those speech units may include a phoneme, syllable, part of a syllable, word, etc. The speech unit may also include a phoneme in context such as a triphone, quinphone, etc. Phonemes in context used regularly in speech may be associated with their own models. Phonemes in context that are less common may be clustered together to have a group model. By clustering phoneme groups in this manner, fewer models may be included in the training corpus, thus easing ASR processing. The training corpus may include multiple versions of the same utterance from different speakers to provide different utterance comparisons for the ASR module 314. The training corpus may also include correctly recognized utterances as well as incorrectly recognized utterances. These incorrectly recognized utterances may include grammar errors, false recognition errors, noise, or other errors that provide the ASR module 314 with examples of error types and corresponding corrections, for example.

Other information may also be stored in the speech storage 320 for use in speech recognition. The contents of the speech storage 320 may be prepared for general ASR use or may be customized to include sounds and words that are likely to be used in a particular application. For example, for ASR processing at an ATM (automated teller machine), the speech storage 320 may include customized data specific to banking transactions. In certain instances, the speech storage 320 may be customized for an individual user based on his/her individualized speech input. To improve performance, the ASR module 314 may revise/update the contents of the speech storage 320 based on feedback of the results of ASR processing, thus enabling the ASR module 314 to improve speech recognition beyond the capabilities provided in the training corpus.

The speech recognition engine 318 attempts to match received feature vectors to words or subword units as known in the speech storage 320. A subword unit may be a phoneme, phoneme in context, syllable, part of a syllable, syllable in context, or any other such portion of a word. The speech recognition engine 318 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The speech recognition engine 318 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented in which the states together represent a potential phoneme (or other speech unit, such as a triphone), and each state is associated with a model, such as a Gaussian mixture model or a deep belief network. Transitions between states may also have an associated probability, representing a likelihood that a current state may be reached from a previous state. Sounds received may be represented as paths between states of the HMM, and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 318, the state may change or stay the same based on the processing of the new feature vectors. A Viterbi algorithm may be used to find the most likely sequence of states based on the processed feature vectors.

Figure 5:
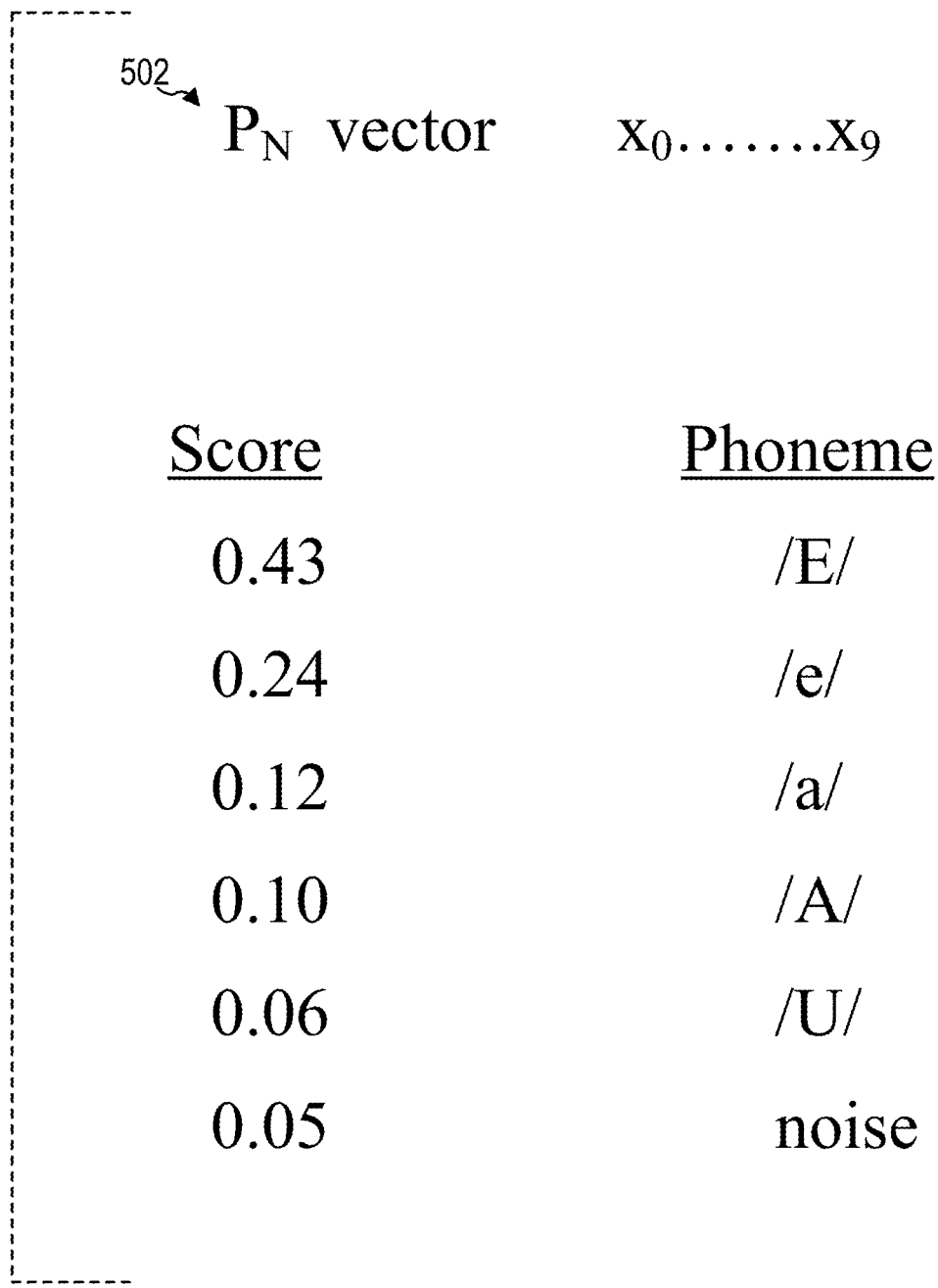
FIG. 5 illustrates phoneme processing according to one aspect of the present disclosure.

In one example, the speech recognition engine 318 may receive a series of feature vectors for sound corresponding to a user saying "Hello, how are you today?" The speech recognition engine 318 may attempt to match each feature vector with a phoneme in the speech recognition database 320. For example, FIG. 5 shows a series of feature vectors 502 corresponding to phoneme $P_N$ (representing the "e" sound in "hello"), including ten feature vectors $X_0$ through $X_9$. Upon processing of the first feature vector, the speech recognition engine 318 makes a preliminary determination as to the probability that the feature vector matches a phoneme, shown as the score in FIG. 5. Based on the feature vector, the phoneme /E/ may be assigned an initial score of 0.43, phoneme /e/ (a different pronunciation from /E/) may be assigned a score of 0.24, etc. The score may be based on how closely the feature vector matches a distribution associated with a phoneme state within one or more acoustic models stored in the speech storage 320. A feature vector may also be assigned a score that the feature vector represents noise or silence. In the example of FIG. 5, the score that the feature vector represents noise is 0.05.

Figure 6:
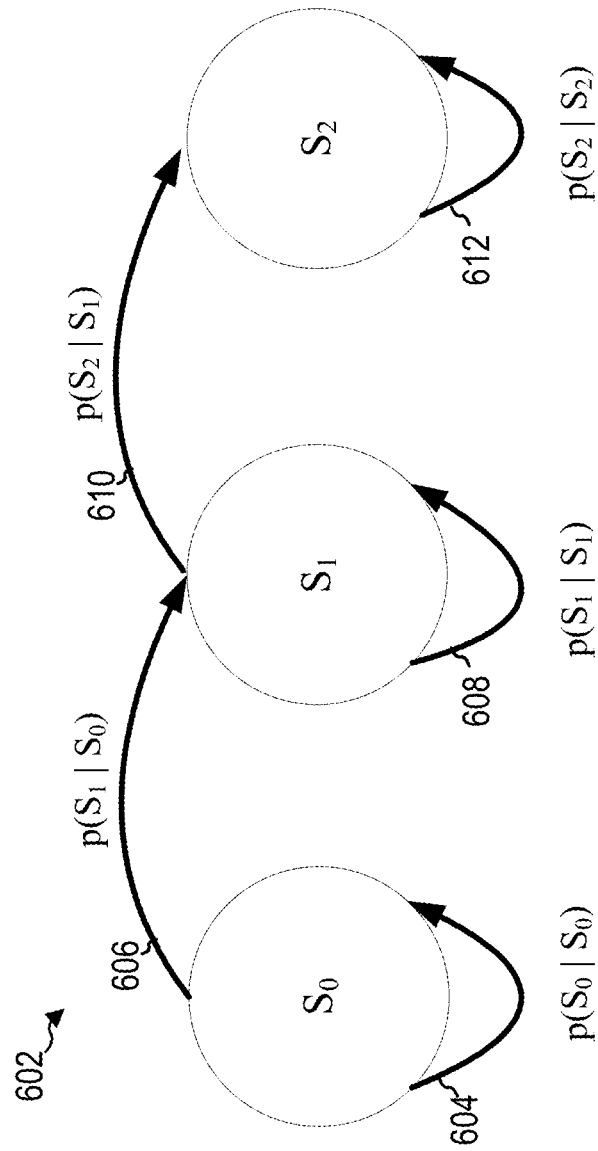
FIG. 6 illustrates phoneme processing in a Hidden Markov Model according to one aspect of the present disclosure.

Taking the example of the feature vector with a score of 0.43 for the phoneme /E/ shown in FIG. 5, the speech recognition engine 318 initially assigns a score of 0.43 that the feature vector matches the first state of the phoneme /E/, shown as state $S_0$ in the Hidden Markov Model illustrated in FIG. 6. After further processing, the speech recognition engine 318 determines whether the state should either remain the same, or change to a new state. For example, whether the state should remain the same 604 may depend on the corresponding transition probability (written as $P(S_0|S_0)$, meaning the probability of going from state $S_0$ to $S_0$) and how well the subsequent frame matches states $S_0$ and $S_1$. If state $S_1$ is the most probable, the calculations move to state $S_1$ and continue from there. For subsequent frames, the speech recognition engine 318 similarly determines whether the state should remain at $S_1$, using the transition probability represented by $P(S_1|S_1)$ 608, or move to the next state, using the transition probability $P(S_2|S_1)$ 610. As the processing continues, the speech recognition engine 318 continues calculating such probabilities including the probability 612 of remaining in state $S_2$ or the probability of moving from a state of illustrated phoneme /E/ to a state of another phoneme. After processing the feature vectors for state $S_2$, the speech recognition may move to the next phoneme in the utterance.

The probabilities and states may be calculated using a number of techniques. For example, probabilities for each state may be calculated using a Gaussian model, Gaussian mixture model, or other technique based on the feature vectors and the contents of the speech storage 320. Techniques such as maximum likelihood estimation (MLE) may be used to estimate the probability of phoneme states.

In addition to calculating potential states for one phoneme as a potential match to a feature vector, the speech recognition engine 318 may also calculate potential states for other phonemes, such as phoneme /e/ and/or phoneme /a/ for the example shown in FIG. 5 as potential matches for the feature vector. In this manner, multiple states and state transition probabilities may be calculated.

The probable states and probable state transitions calculated by the speech recognition engine 318 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The speech recognition engine 318 may also compute scores of branches of the paths based on language models or grammars. Language modeling involves determining scores for what words are likely to be used together to form coherent words and sentences. Application of a language model may improve the likelihood that the ASR module 314 correctly interprets the speech contained in the audio data. For example, acoustic model processing returning the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance. The language modeling may be determined from a training corpus stored in the speech storage 320 and may be customized for particular applications.

Figure 7:
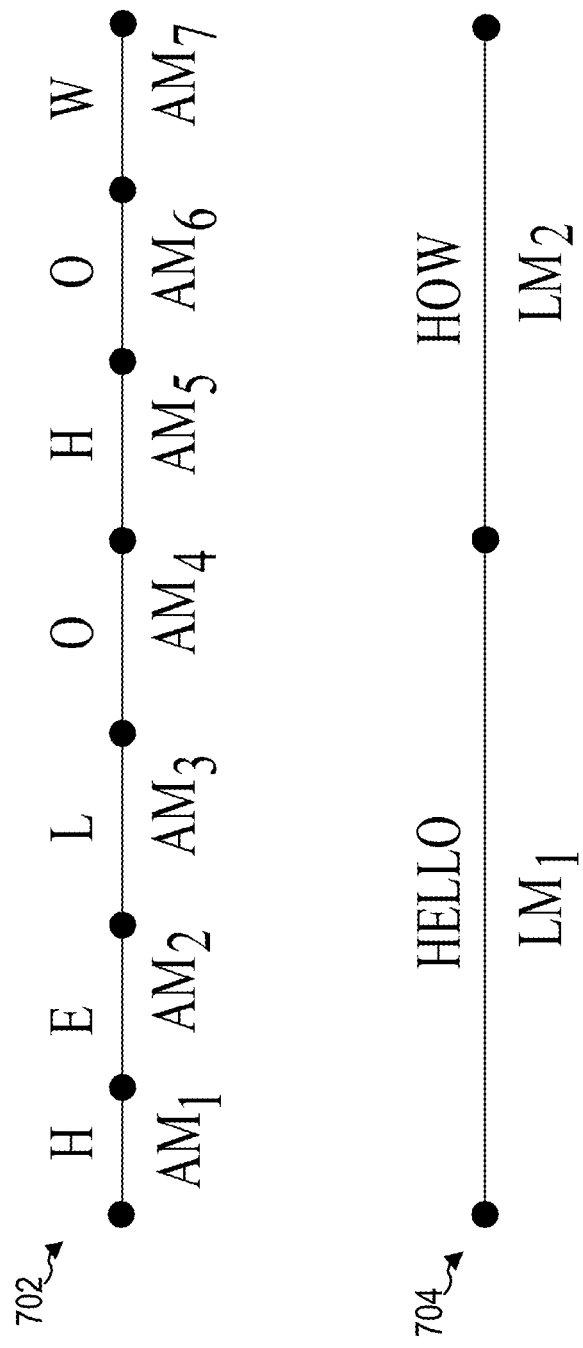
FIG. 7 illustrates phoneme processing and word processing according to one aspect of the present disclosure.

FIG. 7 illustrates the relationship between acoustic modeling and language modeling. As illustrated, each processed phoneme included in the path 702 is associated with an acoustic model score $AM_1$ through $AM_7$. The language model is then applied to associate each word in the path 704 with a language model score $LM_1$ or $LM_2$.

Figure 8:
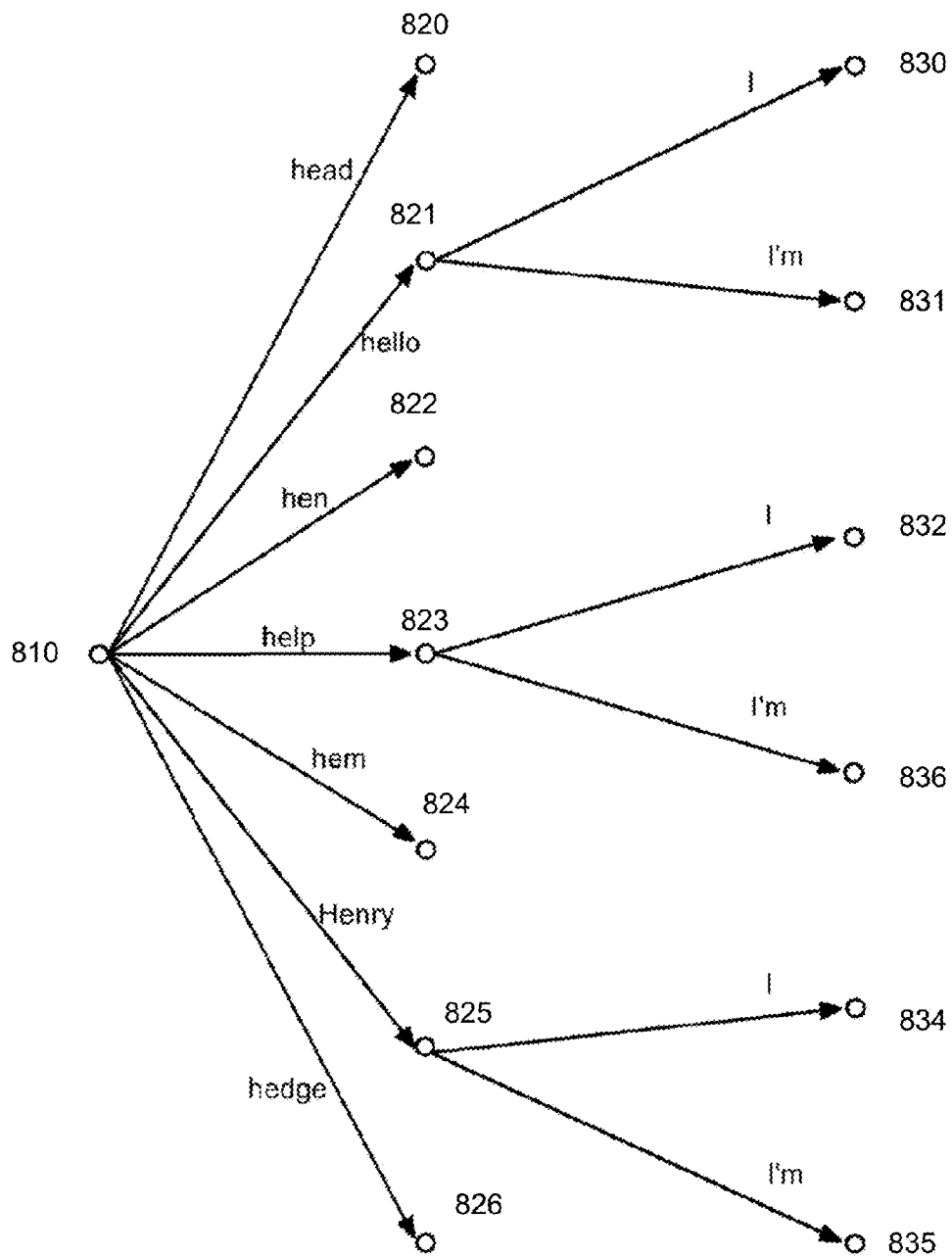
FIG. 8 illustrates a word result network according to one aspect of the present disclosure.

As part of the language modeling (or in other phases of the ASR processing) the speech recognition engine 318 may, to save computational resources, prune and discard low recognition score states or paths that have little likelihood of corresponding to the spoken utterance, either due to low recognition score pursuant to the language model, or for other reasons. Further, during the ASR processing the speech recognition engine 318 may iteratively perform additional processing passes on previously processed utterance portions. Later passes may incorporate results of earlier passes to refine and improve results. As the speech recognition engine 318 determines potential words from the input audio the lattice may become very large as many potential sounds and words are considered as potential matches for the input audio. The potential matches may be illustrated as a word result network representing possible sequences of words that may be recognized and the likelihood of each sequence. FIG. 8 shows an example of a word result network that may be used by a speech recognition engine 318 for recognizing speech according to some aspects of the present disclosure. A word result network may consist of sequences of words that may be recognized and the likelihood of each sequence.

The likelihood of any path in the word result network may be determined by an acoustic model and a language model. In FIG. 8, the paths shown include, for example, "head", "hello I", "hello I'm", "hen", "help I", "help I'm", "'hem", "Henry I", "Henry I'm", and "hedge".

As illustrated in FIG. 8, a word result network may start at initial node 810. At node 810, no words may have been recognized yet as the speech recognition engine 318 commences its processing. From node 810, the speech recognition engine 318 may create arcs and additional nodes where each arc may be associated with a potential word that may be recognized. In some applications, words may be represented by nodes instead of arcs. In FIG. 8, arcs from node 810 to nodes 820 to 826 are labeled with example words that may be recognized by the speech recognition engine 318.

From initial node 810, the speech recognition engine 318 may apply acoustic and language models to determine which of the arcs leaving node 810 are most likely to occur. For an acoustic model employing HMMs, speech recognition engine 318 may create a separate HMM for each arc leaving node 810. Applying the acoustic and language models the speech recognition engine 318 may decide to pursue some subset of the arcs leaving node 810. For example, in FIG. 8, the speech recognition engine 318 may decide to follow the paths starting with "hello", "help", and "Henry" and may decide to stop pursuing the paths starting with "head", "hen", and "hedge" based on the respective scores of those arcs, with the speech recognition engine 318 pursuing only the higher scoring arcs in an effort to concentrate computing resources on the arcs most likely to result in a correct result.

The speech recognition engine 318 may return an N-best list of paths along with their respective recognition scores, corresponding to the top N paths as determined by the speech recognition engine 318. An application (such as a program or component either internal or external to the ASR device 302) that receives the N-best list may then perform further operations or analysis on the list given the list and the associated recognition scores. For example, the N-best list may be used in correcting errors and training various options and processing conditions of the ASR module 314. The speech recognition engine 318 may compare the actual correct utterance with the best result and with other results on the N-best list to determine why incorrect recognitions received certain recognition scores. The speech recognition engine 318 may correct its approach (and may update information in the speech storage 320) to reduce the recognition scores of incorrect approaches in future processing attempts.

In one aspect of the disclosure, the speech recognition engine 318 may use a finite state transducer (FST) instead of a word result network. An FST is a graph that may include all possible words that may be recognized by the speech recognition engine 318. While the word result network of FIG. 8 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 8. The word result network of FIG. 8 may be built out to include all possible utterances that could be recognized by an engine. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is smaller than the word result network. An FST may be smaller because it may have cycles and/or it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be created by composing other FSTs. For example, an FST that includes words and phones may be created by composing an FST of words with an FST of phones.

Figure 9:
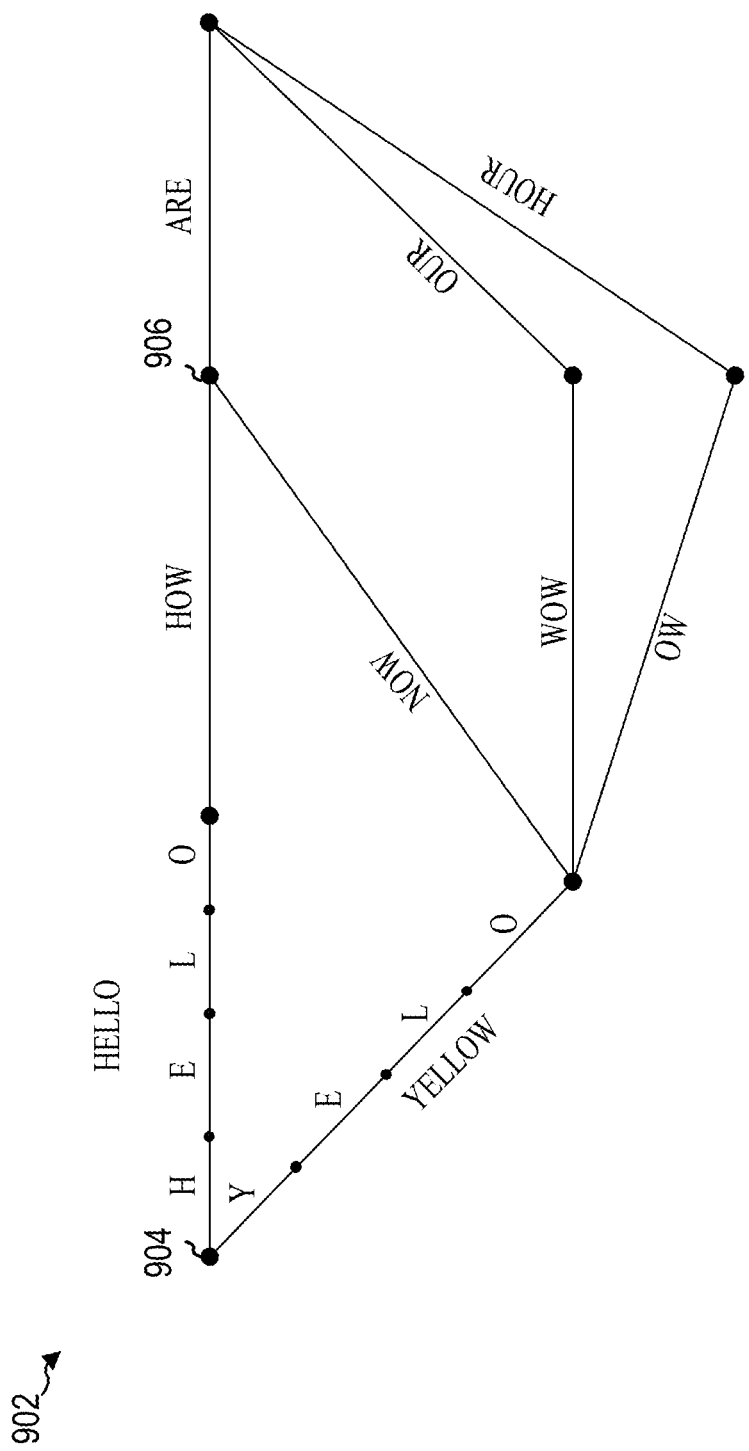
FIG. 9 illustrates a speech recognition lattice according to one aspect of the present disclosure.

The speech recognition engine 318 may combine potential paths into a lattice representing speech recognition results. A sample lattice is shown in FIG. 9. The lattice 902 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 904 and node 906 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 318 as the ASR result for the associated feature vectors. Following ASR processing, the ASR results may be sent by the ASR module 314 to another component of the ASR device 302, such as the controller/processor 308 for further processing (such as execution of a command included in the interpreted text) or to the output device 307 for sending to an external device.

The entire speech processing timeline, from initial receipt of the user's spoken command, to eventual execution of that command as noticed by the user may take a significant amount of computing resources and time to complete. If the amount of time between when a user finishes speaking and results are delivered to the user, called latency, exceeds a certain target latency, it may be noticeable and likely result in a negative experience for the user. Latency of ASR processing may be caused by a number of factors, such as sudden load spikes on an ASR server (which may result in fewer computing resources being available to process ASR tasks), unclear or confusing speech input (which may increase processing time due to many hypotheses scoring poorly, including, in some instances, the best hypotheses), delays introduced when the voice signal is transmitted to the remote speech recognition device, etc. From a system perspective, it is generally desirable to reduce any user noticeable latency and to improve the predictability of the latency reduction techniques.

Offered, is a dynamic speech recognition system and method to detect and reduce the latency between the submission of an utterance to the system by the user and the delivery of a response to the user from the speech recognition system. To manage ASR latency, one or more ASR devices may include a latency management module 332 as shown in FIG. 3. The latency management module 332 may measure time independent latency conditions as disclosed below and, based on those conditions, take action to adjust ASR processing, also as described below, to reduce latency that may be the result of ASR processing. While latency reduction techniques may take many forms, this disclosure is focused on detecting when ASR processing should be adjusted based on the measured conditions. The techniques described here may also be combined with other techniques, such as network improvement techniques, application improvement techniques, etc.

In one aspect of the disclosure, the system measures a time independent metric indicative of some measure of the work done by an ASR processor during a current ASR task. Based on the metric the system determines whether the system is likely to experience undesirable latency. For example, the system may compare the metric to a threshold to determine if the metric exceeds the threshold, thus indicating potentially undesirable high latency. If so, the system may implement one or more latency reducing techniques. In some aspects, the comparison may be a binary implementation where the threshold value is unadjustable or based on a single level. In other implementations, the adjustment of the parameter is based on a gradation of values or based on a sliding scale. For example, different parameter values may be used to accomplish multiple adjustments to the speech recognition to reduce the latency by varying degrees.

The metric(s) chosen to measure for purposes of determining the system's latency may be metric(s) that are not time, but may give an indication of how long a pending ASR task may take to complete. Thus, measurement of the metrics(s) may not be a direct measurement of latency (in units of time) but may correlate to latency. The metric(s) may describe an aspect of ongoing operation of the ASR process. The metric may be measured over a certain amount of processing to determine latency. For example, the metric may be indicative of work done over a certain number of frame(s) of audio.

One example ASR metric that the system may measure is a number of active nodes being considered by the ASR processor. As discussed above in reference to FIGS. 8 and 9, as an ASR device processes incoming audio it may explore portions of a graph, such as an FST graph or decoding graph. The graph includes active nodes and inactive nodes. Each of the active nodes of the graph represents a potential hypothesis of the audio under consideration by the ASR device. Inactive nodes are nodes in the graph associated with small enough scores such that they are pruned by the ASR device during processing and are no longer included in the potential hypotheses. The amount of work done by the processor of the ASR device may be based on the number of active nodes. Thus, the more active nodes, the more processing power dedicated for ASR processing the frames of the audio input. The increase in the amount of work done by the processor often correlates to an increase in the amount of time for the speech recognition to complete (i.e., latency). Similarly, a decrease in the processor instructions or work done by the processor often correlates to a decrease in the amount of time for the speech recognition. As a result, the number of active nodes considered by the ASR processor for a certain length of audio may indicate a relative level of latency. If the number of active nodes for a certain length of audio exceeds a threshold, the ASR system may implement latency reducing techniques. For example, the number of nodes processed over a certain number of frames will give an indication of approximately how many nodes are being processed per frame. This number may be compared to a threshold to determine latency. For example, the ASR system may keep track of the cumulative number of nodes processed since beginning to process a particular audio input. The ASR system may also keep track of the number of frames of audio processed. At various points the ASR system may divide the number of nodes processed by the number of frames process to determine an average number of nodes per frame. If this average exceeds a certain threshold, the ASR system may implement latency reducing techniques. The threshold may be determined based on speech recognition training, as to what average number of nodes per frame indicates fast processing, slow processing, etc.

Another example ASR metric that the system may measure is a number of processor instructions retired or number of instructions to process an audio input so far. In one aspect, the number of instructions retired may be measured for every frame of the audio input. In other aspects, the number of instructions retired may be measured periodically or randomly for a defined number of frames of the audio input. For example, the number of instructions may be measured every five frames of the audio input. The number of instructions executed by the ASR processor for a certain length of audio may indicate a relative level of latency. If the number of instructions needed to process a certain length of audio exceeds a threshold, the ASR system may implement latency reducing techniques. For example, the number of instructions executed over a certain number of frames will give an indication of approximately how many instructions are being executed per frame. This number may be compared to a threshold to determine latency. For example, the ASR system may keep track of the cumulative number of instructions executed since beginning to process a particular audio input. The ASR system may also keep track of the number of frames of audio processed. At various points the ASR system may divide the number of instructions executed by the number of frames process to determine an average number of instructions per frame. If this average exceeds a certain threshold, the ASR system may implement latency reducing techniques. The threshold may be determined based on speech recognition training, as to what average number of instructions per frame indicates fast processing, slow processing, etc.

Another example ASR metric that the system may consider is a complexity of the nodes being processed. For example, the dynamic speech recognition system may measure expected latency by measuring a reference value allocated to active nodes after processing frames of the audio input. In one aspect, the reference value is a Gaussian score or acoustic score allocated to each active node. In some aspects, each reference value may be directly proportional to a number of instructions for performing speech recognition at the respective node, thus indicating how expensive (in terms of computational resources) The node is to process. As the ASR system is processing, it may track the reference value of processed nodes (either individually, or in the aggregate) along with the number of frames of audio processed. The ASR system may then compare the reference value(s) to a threshold to determine if the audio being processed by the system is more or less complicated to process than typical audio. If the reference value(s) exceed the threshold, they may indicate complicated audio that is likely to suffer from increased latency, and the system may implement one or more latency reducing techniques.

In one aspect, the ASR system may compute a total reference value of how many nodes have been processed so far (for example compute the total Gaussian score). This total reference value may indicate how much work a processor has done processing frames of the audio input and thus may correlate to latency.

Another example ASR metric that the system may consider is a node branching factor, which also may indicate complexity of nodes being processed. Each of the nodes in the active list is part of a decoding graph (e.g., directed graph with cycles) for speech recognition, for example as discussed above. Within the decoding graph, the active nodes include arcs. The arcs may be in-arcs that are a set of arcs coming into the active node and out-arcs that are a set of arcs going out of the active node. The branching factor of the active nodes includes the out-arcs. Generally, the more out-arcs that are associated with an active node, the more computationally expensive it is to process the particular node. Thus the system may track the number of out-arcs processed over a certain number of frames. This value may then be used as a metric to estimate latency.

Another example ASR metric that the system may consider is a Gaussian mixture-component-count metric. The Gaussian mixture-component-count metric is a measure of complexity of an acoustic model. For example, a complexity of the active portion of the acoustic model is determined based on a sum of a collection of Gaussian mixture components. The expense associated with scoring the active portion of the acoustic model increases with an increase in the Gaussian mixture component. For example, an increased number of Gaussian mixture components may be used to process speech from a user with strong accent than a user with an accent that is recognizable by the acoustic model. Thus, the higher a Gaussian mixture-component-count, the more computationally intensive processing of the associated acoustic model will be. Thus, a higher Gaussian mixture-component-count may indicate a higher latency. If a Gaussian mixture-component-count is above a threshold, the system may thus implement one or more latency reducing techniques.

In some aspects of the disclosure, the dynamic speech recognition system may estimate latency based on an audio quality metric, such as a signal to noise ratio (SNR), or other quality measurement, of the received audio. The signal to noise ratio of the received audio may be determined or measured at a front end of the speech recognition system. In general, noisy signals require more processing power than signals that are not noisy. Thus, knowledge of the signal to noise ratio of the audio may be used as a predictor of how much work the processor will do in the future. Thus, if an audio quality metric, such as SNR, is above a threshold, the system may implement latency reducing techniques to speed processing.

The value of various thresholds used to compare against various metrics for determining latency (including ASR metrics, audio quality metrics, etc.) may be determined based on training or tuning the system to recognize when certain values of the metric correlate to high latency. In one aspect, a training corpus may be used to train the speech recognition models, including the acoustic models and language models. The models may then be used during ASR processing. For example, the training may include implementing a large number of speech recognition tasks to determine a correlation between the time independent speech recognition metrics and the real time for processing speech recognition. In some aspects, the threshold value may be determined based on the training. For example, the work done by the processor during a current speech recognition of an audio is measured and compared to the threshold value of work to determine whether processing of the audio input is delayed. This threshold value may be determined based on the training. In another example, the threshold values may be adjusted based on real time performance of the ASR system, thus incorporating training adjustments based on system performance. For example, if speech is being processed in real time (that is, text is output at approximately the same speed as audio is input, resulting in a real time factor (RTF) of 1), then a threshold may be a first level, but if the RTF is above or below 1, the threshold may be adjusted to allow for faster or slower ASR processing.

In one aspect of the disclosure, the processor may be one or more processors for performing the speech recognition. The one or more processors may include multiple processors configured for multi-threaded processing. For example, one thread may perform decoding of the graph and another thread may perform scoring. Or multiple threads may be combined in a different manner. When a multi-threaded approach is used for speech recognition, the ASR system may identify one or more threads of the multi-threaded processor that are subjected to a bottleneck relative to the other threads. Aspects of the time independent latency reduction techniques may then be applied to the one or more identified bottleneck threads. Latency measuring may also involve combining metrics measured on each thread. In one example, a decision function may analyze each thread independently, and whichever thread is determined to experience the highest latency may be subject to latency reducing. In another example, metrics may be measured across a combination of threads and summed, or averaged, to get a determination of overall latency.

When the system determines that it should take steps to reduce latency, a variety of techniques may be implemented to reduce the latency of ASR processing. As described below, latency reducing may involve adjusting one or more ASR parameters to speed ASR processing, or may involve other latency reducing techniques.

One example latency reducing technique is to reduce a number of active nodes considered by the ASR system during unit selection. The fewer active nodes considered at one time, the faster the processing and the lower the latency. The number of active nodes may be reduced by reducing a threshold score for each path being considered. In another example, the maximum number of nodes being considered may be reduced by pruning at least some of the expensive active nodes rather than randomly pruning the active nodes. Thus, the expensive or undesirable active nodes may be pruned dynamically by the ASR system while desirable or inexpensive active nodes may be retained during ASR processing. Pruning undesirable active nodes reduces the number of active nodes and reduces the work done by the processor during speech recognition.

Active nodes may also be reduced by reducing a beam width. The range of potential path scores of a graph to remain under consideration is considered the "beam width." To speed ASR processing and reduce latency, the width of the beam may be reduced. In typical ASR systems, a number of active nodes and beam width are static values. For example, the beam width and the maximum number of active nodes are typically not changed as processing of an ASR task processing progresses. In the present system, however, those values may be dynamically altered, thus allowing the ASR system to adjust a number of active nodes and/or a beam width while an ASR task is processing to dynamically reduce latency.

Other latency reducing techniques may be based on whether information about the nodes is stored in cache. Nodes that have information present in cache can be processed faster (i.e., be less expensive to process) than nodes without information in cache. In this case, the list of active nodes may be pruned based on whether information about the nodes are stored in cache. For example, the nodes that have information in cache may be added to the list of active nodes while the nodes without information in cache are removed or assigned low scores.

Latency improvement may also involve applying graph pruning techniques to limit the number of arcs and nodes that may be considered. Applying graph pruning parameters to the recognition features may entail assigning weights to the features of the ASR techniques and/or to individual arcs/paths or nodes. The weights may cause the recognition scores of certain features to worse or better. The weights may be dynamically adjusted during an ongoing utterance by increasing or decreasing the weights to vary the recognition scores of the features. The dynamic adjustment of the recognition scores of the features of the ASR techniques may cause certain features of the ASR techniques to meet or fail to meet a threshold recognition score value and are therefore eliminated or incorporated into the graph based on the adjustment. In some aspects of the disclosure, the threshold recognition score may be dynamically adjusted based on whether the speech recognition system is currently subjected to latency pressure.

In another aspect, in the presence of undesired latency, certain paths or portions of a graph may be weighted to make those paths higher or lower scoring to speed up ASR processing. Certain regions of a graph may be tagged with different identifiers so that under certain conditions the scores associated with portions of the graph may be adjusted. Multiple different tags may be used to make the system more configurable and adjustable to respond to different latency/utterance conditions. In this manner, the ASR processing may be more finely tuned. If certain portions of the graph may take longer to process or are computationally expensive but should not be discarded entirely, those portions may be weighted lower under high latency conditions. Alternatively, if those portions should be discarded, their weights may be set to zero. In some aspects, some arcs may be tagged based on 'obscurity' measures to avoid those arcs when the speech recognition system is subjected to latency pressure. Similarly, if other portions of the graph are less computationally expensive, etc., those portions may be weighted higher under high latency conditions in an attempt to have the ASR system focus its processing more heavily on the most likely paths. These adjustable weights may be set for different words, word patterns, or any other configuration based on desired tuning and/or empirical experimentation for how well the weighting reduces latency. The weights may also be configured/adjusted based on the specific user who spoke the utterance, particular audio conditions, etc. For example, words that are commonly spoken by the user may receive higher weights than words rarely spoken by the particular user.

In one aspect of the disclosure, the dynamic speech recognition system may reduce latency based on the complexity (e.g., acoustic complexity) of the speech recognition model associated with the nodes and the decoding graph. The models may include mel-frequency cepstral coefficients (MFCCs), perceptual linear predictive (PLP) techniques, neural network feature vector techniques, deep neural network techniques, linear discriminant analysis, semi-tied covariance matrices, deep belief networks or other approaches known to those of skill in the art. For example, the complexity of the network may be accounted for when scoring the active nodes of systems that implement on-demand scoring. Therefore, in addition to acoustically scoring active nodes based on work done by the processor on the active node, the complexity of the speech recognition model at the active node may be accounted for in the acoustic score. Accounting for the complexity of the speech recognition model is desirable for systems in which the expense associated with processing the active nodes varies. In this aspect, the system may collectively weight the complexity of the nodes. For example, the complexity of acoustic model scoring (indicating how expensive it will be to score nodes relative to the set of active nodes) may be measured and used as part of the time independent speech recognition metric. In some aspects, the complexity of the acoustic model scoring may correspond to a Gaussian score or number of Gaussian scores, which may be used for pruning as described herein to reduce latency of speech recognition.

In one aspect of the disclosure, to speed up ASR processing the ASR system may disregard certain acoustic features for a particular incoming frame of audio. That is the feature vector associated with the incoming frame may not be populated with each potential feature to allow for faster processing of the feature vectors, and thus the entire utterance. The features that may be omitted may be selected dynamically based on the incoming audio of the utterance, as well as based on previous experimentation, to determine which features may be ignored without the quality of results suffering too greatly. The acoustic features may be ranked based on their accuracy or a likelihood that the acoustic features contribute to a correct pathway along the decoder graph. The processing of certain features of the acoustic model may be dynamically adjusted based on a desire to speed up or slow down the speech recognition process. For example, performance of the acoustic model may be adjusted to reduce the latency of the speech recognition system by assigning weights to the features.

In some aspects of the disclosure, the models (e.g., acoustic model, language model or grammar) or features of the models are selected based on a user's tendency for latency or pattern of use of the speech recognition system. For example, a faster but less accurate model (such as a smaller sized grammar) may be selected if the user tends to be subjected to an undesirable latency for his/her utterances. Further, paths on the graph may be weighted as described above based on the parts of the graph that the user tends to use. Furthermore, multiple users with similar behavior, may be clustered together and the weights for the paths, or other ASR parameters, for the clustered users are selected based on the behavior of the clustered users. For example, the cluster of users may have similar musical taste (e.g., classical music), and may therefore use similar search terms or words when selecting music to play. As a result, their utterance may be processed at similar parts of the network or may follow similar pathway along the graph. In contrast, a user with an interest in pop music may use different words than those associated with classical music and may therefore use a different part of the network.

In one aspect of the present disclosure, the latency reducing techniques are adjustable in view of computer resources available to the speech recognition system. The computer resources may include resources shared resources, such as a central processing unit (CPU) resources or server load and/or memory resources. When computer resources are scarce, such as a predicted or existing high load at a server or CPU or when the memory capacity is exceeded by the load, the latency reducing techniques may be tightened to decrease the number of speech units to be processed by the server CPU or retrieved/stored in memory. By reducing the number of speech units to be processed/stored/retrieved, a server, CPU and/or memory may dedicate fewer computer resources (such as CPU time, etc.) to each individual request, thereby allowing the server or CPU to process more requests in a shorter period of time or to free up memory for other shared applications. In another aspect, if computing resources may be available from other devices, when faced with high latency an ASR device may request additional resources from one or more other ASR devices.

Other latency reducing techniques include skipping at least some speech recognition steps, such as language model rescoring, lattice-based acoustic model rescoring, confusion network generation, N-best list generation, confidence generation, lattice determinization and minimization, or other speech recognition calculations that may be omitted to speed processing.

Figure 10:
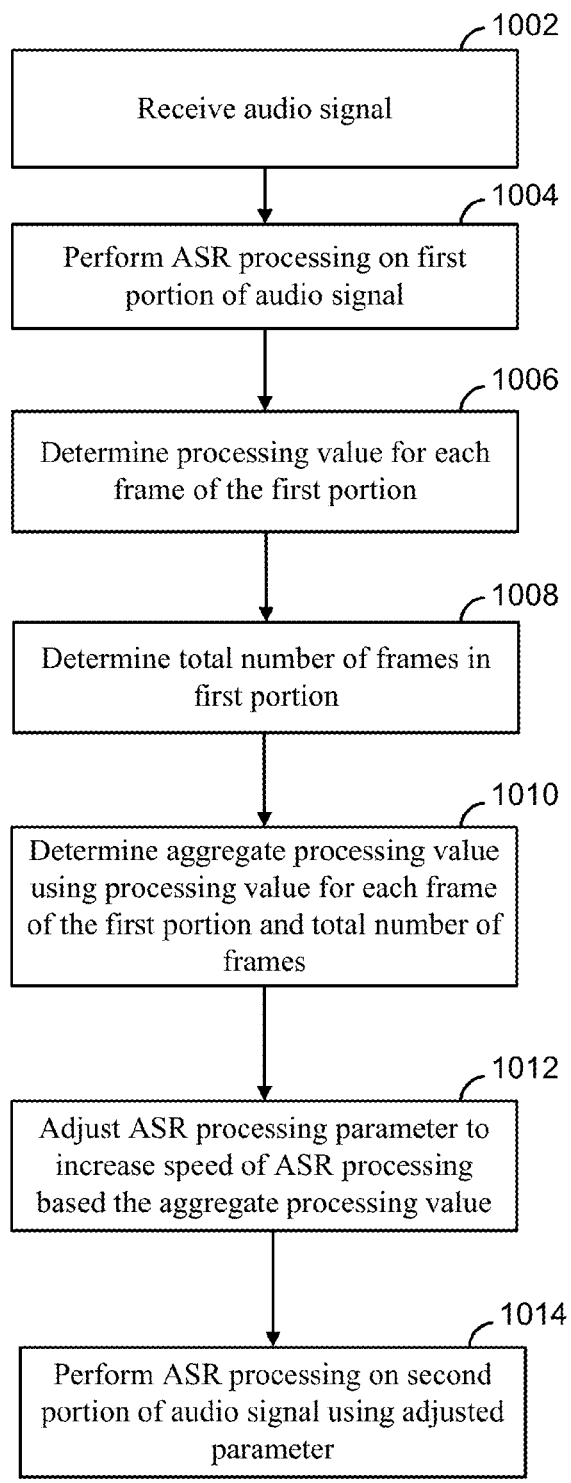
FIG. 10 illustrates a method for dynamically adjusting speech recognition features of a speech recognition system according to one aspect of the present disclosure.

FIG. 10 illustrates a method for dynamically adjusting ASR processing according to aspects of the present disclosure. The method may be implemented at a speech recognition system (e.g., speech recognition system 100). In some aspects of the disclosure, the speech recognition system may be incorporated into a remote device (e.g., a server over a network) that is coupled to a user device or may be distributed between the remote server and the user device. At block 1002, the speech recognition system may receive an audio signal corresponding to an utterance of a user. At block 1004, the speech recognition system may perform speech recognition processing on a first portion of the audio signal. The first portion of the audio signal may include a first number of frames. At block 1006, the speech recognition system may determine a processing value for each frame of the first portion. The processing value corresponds to an amount of processing performed by one or more processors. At block 1008, the speech recognition system may determine a total number of frames in the first portion. At block 1010, the speech recognition system may determine an aggregate processing value using the processing value for each frame of the first portion and the total number of frames. At block 1012, the speech recognition system may adjust a speech recognition processing parameter to increase a speed of the speech recognition processing based on the aggregate processing value. At block 1014, the speech recognition system may perform speech recognition processing on a second portion of the audio signal using the adjusted speech recognition processing parameter.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the ASR techniques described herein may be applied to many different languages, based on the language information stored in the speech storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean, "based at least in part on" unless specifically stated otherwise.

What is claimed is:

1. A method for dynamically adjusting speech recognition processing to reduce latency, the method comprising:
   receiving an audio signal, the audio signal corresponding to an utterance;
   performing first speech recognition processing on a first portion of the audio signal, the first speech recognition processing involving a first plurality of hypotheses, each of the first plurality having a respective score within a first hypothesis score range;
   determining a processing value for each frame of the first portion, wherein the processing value corresponds to an amount of processing performed by one or more processors;
   determining a total number of frames in the first portion;
   determining, using the processing value, an estimated amount of time to process the first portion;
   determining that the estimated amount of time is above a time threshold;
   determining an adjusted hypothesis score range to increase a speed of speech recognition processing in response to the estimated amount of time being above the time threshold; and
   performing second speech recognition processing on a second portion of the audio signal using, the second speech recognition processing involving a second plurality of hypotheses, each of the first plurality having a respective score within the adjusted hypothesis score range, the second plurality including fewer hypotheses than the first plurality.

2. The method of claim 1, wherein the processing value corresponds to at least one of:
   a number of active nodes of a speech decoding graph being considered;
   a number of Gaussian mixture-components scored;
   a number of nodes of the speech decoding graph traversed;
   an audio quality metric value of the audio signal;
   a number of arcs added to a decoding graph; or
   a number of processor instructions executed.

3. A computing device, comprising:
   at least one processor;
   a memory device including instructions operable to be executed by the at least one processor to perform a set of actions, configuring the at least one processor to:
   receive an audio signal, the audio signal corresponding to an utterance;

perform first speech recognition processing on a first portion of the audio signal, the first speech recognition processing involving a first plurality of hypotheses, each of the first plurality having a respective score within a first hypothesis score range, the first portion comprising a number of frames;

determine a first processing value corresponding to a quantity of speech recognition processing performed for the number of frames;

determine, using the first processing value, an estimated amount of time to process the first portion;

determine that the estimated amount of time is above a time threshold;

determine a first adjusted hypothesis score range in response to the estimated amount of time being above the time threshold; and perform second speech recognition processing on a second portion of the audio signal using, the second speech recognition processing involving a second plurality of hypotheses, each of the second plurality having a respective score within the first adjusted hypothesis score range, the second plurality including fewer hypotheses than the first plurality.

4. The computing device of claim 3, wherein the at least one processor is further configured to adjust the time threshold based on an estimated real time factor of the speech recognition processing of the audio signal.

5. The computing device of claim 3, wherein first processing value comprises at least one of:
   a number of active nodes of a speech decoding graph being considered during the speech recognition processing of the number of frames;
   a number of Gaussian mixture-components scored during the speech recognition processing of the number of frames;
   a number of nodes of the speech decoding graph traversed over the number of frames;
   an audio quality value of the audio signal;
   a number of arcs of a decoding graph considered during the speech recognition processing of the number of frames; or
   a number of processor instructions executed during speech recognition processing of the number of frames.

6. The computing device of claim 3, wherein the at least one processor is further configured to:
   determine a new processing value corresponding to a quantity of speech recognition processing performed for a third portion of the audio signal; and
   determine a second adjusted hypothesis score range for a fourth portion of the audio signal in response to the determination of the new processing value.

7. The computing device of claim 3, wherein the at least one processor is further configured to:
   determine a new processing value corresponding to a quantity of speech recognition processing performed for a minimum number of frames of the audio signal; and
   determine a second adjusted hypothesis score range in response to processing the minimum number of frames of the first portion of the audio signal.

8. The computing device of claim 3, wherein the at least one processor is further configured to:
   determine a second processing value corresponding to a quantity of speech recognition processing performed for the number of frames; and determine a second adjusted hypothesis score range based on the first processing value and/or the second processing value for each frame of the first portion of the audio signal.

9. A non-transitory computer-readable storage medium storing processor-executable instructions for controlling a computing device, comprising program code to:
   receive an audio signal, the audio signal corresponding to an utterance;
   perform first speech recognition processing on a first portion of the audio signal the first speech recognition processing involving a first plurality of hypotheses, each of the first plurality having a respective score within a first hypothesis score range, the first portion comprising a number of frames;
   determine a first processing value corresponding to a quantity of speech recognition processing performed for the number of frames;
   determine, using the first processing value, an estimated amount of time to process the first portion;
   determine that the estimated amount of time is above a time threshold;
   determine a first adjusted hypothesis score range in response to the estimated amount of time being above the time threshold; and
   perform second speech recognition processing on a second portion of the audio signal using, the second speech recognition processing involving a second plurality of hypotheses, each of the second plurality having a respective score within the first adjusted hypothesis score range, the second plurality including fewer hypotheses than the first plurality.

10. The non-transitory computer-readable storage medium of claim 9, further comprising program code to adjust the time threshold based on an estimated real time factor of the speech recognition processing of the audio signal.

11. The non-transitory computer-readable storage medium of claim 9, wherein first processing value comprises at least one of:
   a number of active nodes of a speech decoding graph being considered during the speech recognition processing of the number of frames;
   a number of Gaussian mixture-components scored during the speech recognition processing of the number of frames;
   a number of nodes of the speech decoding graph traversed over the number of frames;
   an audio quality value of the audio signal;
   a number of arcs of a decoding graph considered during the speech recognition processing of the number of frames; or
   a number of processor instructions executed during speech recognition processing of the number of frames.

12. The non-transitory computer-readable storage medium of claim 9, further comprising program code to:
   determine a processing value corresponding to a quantity of speech recognition processing performed for a third portion of the audio signal; and
   determine a second adjusted hypothesis score range for a fourth portion of the audio signal in response to the determination of the new processing value.

13. The non-transitory computer-readable storage medium of claim 9, further comprising program code to:
   determine a processing value corresponding to a quantity of speech recognition processing performed for a minimum number of frames of the audio signal; and determine a second adjusted hypothesis score range in response to processing the minimum number of frames of the first portion of the audio signal.

14. The non-transitory computer-readable storage medium of claim 9, further comprising program code to:
   determine a second processing value corresponding to a quantity of speech recognition processing performed for the number of frames; and
   determine a second adjusted hypothesis score range based on the first processing value and/or the second processing value for each frame of the first portion of the audio signal.

\* \* \* \* \*